J. D. C. Outwater.
Cultivator & Potato Digger.
N° 71525.  Patented Nov. 26, 1867.
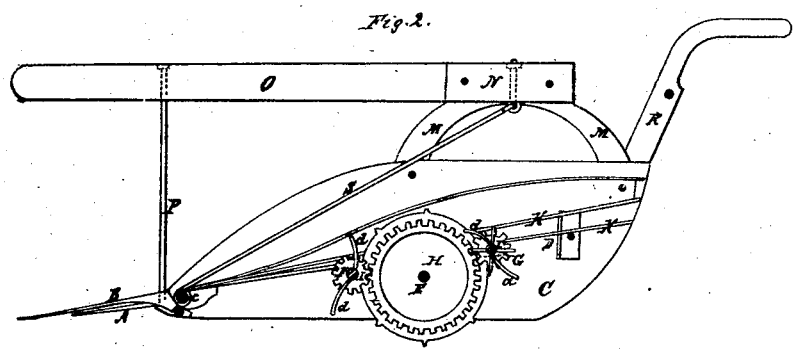
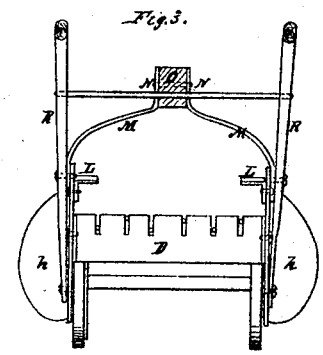
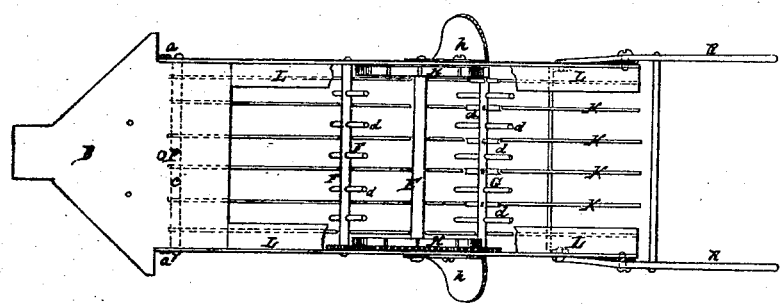
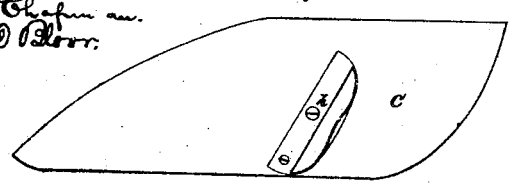
Witnesses.
Inventor.
Jacob D. C. Outwater
per Holmead & Hollinghead
Attorneys.

United States Patent Office.

JACOB D. C. OUTWATER, OF NEWARK, NEW JERSEY.

Letters Patent No. 71,525, dated November 26, 1867.

---

IMPROVEMENT IN COMBINED CULTIVATOR AND POTATO-DIGGER.

---

The Schedule referred to in these Letters Patent and making part of the same.

---

TO ALL WHOM IT MAY CONCERN:

Be it known that I, JACOB D. C. OUTWATER, of the city of Newark, in the State of New Jersey, have invented certain new and useful Improvements in Combined Cultivator and Potato-Diggers; and I do hereby declare that the following is a full, clear, and exact description of the same, reference being had to the annexed drawings, and to the letters of reference marked thereon, making part of the same, in which—

Figure 1 is a plan view.

Figure 2 is a longitudinal vertical section of the same.

Figure 3 is an end view, clearly showing the rear slotted brace-bar and cultivator attachment.

Figure 4 is a face view of the land-side and cultivator-share attached.

My invention consists, first, in casting the shoe with a slotted grooved cylinder at its upper end. Through this cylinder passes a bearing-rod, to which are firmly attached the tines. The tines are secured in the slots. The slots, therefore, regulate the number of tines that can be used, as well as the distance they are separated from each other. Instead of the continuous cylinder, however, the shoe may be cast with short curved projections or cylinder-sections. These must be sufficient in number to furnish secure supports or rests for the bearing-rod. The tines are secured to the rod as before, and their distance from each other is regulated by means of loose sliding blocks, which have openings in their centres, and through which the rod passes, retaining the blocks in the desired position between the tines. This shoe is firmly secured to the forward end of the land-sides.

The land-sides are so constructed and arranged that they not only furnish suitable and convenient bearings, but at the same time form a perfect casing or framework for the entire gearing mechanism. The upper portions of the sides also form, as it were, a trough, through which the potatoes are safely conveyed to the rear of the digger, to the point at which it is desired they should be dropped. These land-sides are cast with flanges or guard-plates on their inner sides. These flanges or plates are arranged in such position, relative to the land-sides and gearing-mechanism, that when the machine is put together they will rest immediately above the latter, so as entirely to protect and shield the same from all contact with the falling clod, or other matter which may be brought to and conveyed with the potatoes along the tines. These land-sides are connected and firmly secured, at their rear ends, by a brace-bar. This brace-bar is constructed with slots, so that, while it retains the land-sides in their proper position, it at the same time serves as a support for the rear end of the tines. The tines are so arranged, in connection with the slots, that each tine has a distinct and independent slot to work in, said slots being constructed of such width that while the tines are safely secured, at the same time sufficient play for their free operation is allowed.

To the land-sides, about midway of their length, I secure the main shaft, which supports and on which works the driving-wheel. The driving-wheel is constructed with a toothed wheel attached. Whenever necessity or convenience may require, two, instead of a single driving-wheel, may be used. These wheels may also be constructed with flanges on their outer surfaces. When two wheels are used, they are arranged on the opposite ends of the shaft, having their point of bearing near the land-sides.

Immediately in front and rear of the main shaft are arranged two shafts. These shafts furnish bearings for the two pinion-wheels which gear, and whose teeth mesh with the teeth of the driving-wheel. One of these wheels imparts the motion to the shaft which operates the tines. These shafts are constructed with small holes passing through them, in which are secured straight or curved pins, or the shafts may be cast with the pins attached. The pins of one of the shafts are constructed with slotted or bevelled heads, which, being brought in contact with the tines during the revolution of the shaft, elevate the same. The pins of the other shaft, or "traveller," work in between the tines, and, while they assist in conveying the potatoes, at the same time free the same from the dirt, weeds, or other obstruction.

To the land-sides, at convenient points, I attach brace-rods, having bearing-plates at their upper ends. Between these bearing-plates I firmly secure the rear end of the beam. The front end of the beam is secured to and supported by a brace-rod or cutter, which passes through and is firmly secured on the under side of the shoe. Should occasion require, an additional brace-rod may be introduced, in order to more firmly support the beam. One end of this rod is attached to the under side of the beam, near its rear, or point of contact with the brace-plates; the other end is attached, under the shoe, to the forward brace-rod or cutter.

My invention is not only useful as a potato-digger, but can readily be arranged so as to act as a cultivator. The only change necessary to properly adapt it for the latter use is the addition of the cultivator-shares. These shares I firmly secure to the outside of the land-sides, in such manner that when the machine is in operation they will throw the dirt to the growing crop or "hill."

In order to enable others skilled in the art to make and use my invention, I will proceed to describe its construction and operation.

A is the sole or shoe, which may be constructed of light casting. This sole is attached to the land-side by suitable bearing-plate and pins $a\ a'$. B is the double share, which is securely attached to the sole A. C C are land-sides, which are attached at their forward ends to the sole A, at the points $a\ a'$, and are connected at their rear ends by the slotted brace-bar D. Between these land-sides are arranged, in suitable bearings, the main driving-shaft E and the two pinion-shafts F and G. On the main shaft there are one or two, as occasion may require, driving-wheels H. These wheels mesh with the pinion-wheels I I, which are attached to the shafts F and G.

Between the land-sides C C rest and operate a number of tines K K. These tines are secured to the rod $c$, which works in a cylinder cast on the upper portion of the shoe. The method of attachment is both simple and practical. The cylinder is cast with a series of slots. Through these slots the rod $c$ is left exposed. The ends of the tines are lapped around the rod in such a manner as to form a loop, which loop acts in connection with the rod, on the principle of a hinged joint. The shafts F and G are cast with straight or curved pins $d\ d$, or the shafts may be constructed with holes, and the pins $d\ d$ may be afterwards inserted. These pins $d\ d$ are so arranged on the shaft F that they work between the tines during the revolution of the shaft. The pins $d\ d$ of the shaft G are constructed with slotted or bevelled heads, and are so arranged on the shaft that they work immediately under the tines, so as to elevate the same, thus imparting the motion necessary to their successful operation. The rear ends of the tines K K rest and work in slots $e\ e$ of the brace-bar D.

On the inside of the land-sides C C, I secure two flanges or guard-plates L L, one being attached to each land-side. These guard-plates are arranged immediately above the cogged gearing, and securely shield the same. To the land-sides, at suitable points, I attach brace-rods M M. These brace-rods are so constructed and arranged as to form two bearing-plates N N, between which the beam O is firmly secured. The beam is supported and held at its forward end by means of a brace-rod or cutter, P, which is securely fastened on the under side of the shoe. R R are handles, which are constructed in the usual manner, and attached to the land-sides. If deemed necessary, an additional brace-rod, S, may be introduced, one end of which is secured to the under side of the beam at $f$; the other end is attached to the under portion of the brace-rod or cutter P.

When it is desired to use my device as a cultivator, it can readily be adapted for that purpose, simply by attaching to the land-sides C C cultivator-shares $h\ h$.

Having thus fully described my invention, what I claim therein as new, and desire to secure by Letters Patent, is—

1. Casting the shoe with a slotted cylinder, or its equivalent, on its under surface, substantially as described, and for the purposes set forth.

2. I claim the cylinder, cast on the under surface of the shoe, in combination with the tines K K and rod $c$, when the same are constructed, arranged, and operated substantially as described.

3. I claim operating the tines K K by means of a shaft, G, having pins $d\ d$, said pins being constructed with or without slotted or bevelled heads, when the same are arranged substantially as described.

4. I claim the shaft F, constructed with pins $d\ d$, when said pins are so arranged as to work between the tines K K, substantially as described and for the purpose set forth.

5. I claim the main shaft E, having one or more ground or driving-wheels attached, one of said wheels being furnished with cogs, substantially as described and for the purpose set forth.

6. I claim constructing a potato-digger with land-sides C C, substantially as described, and for the purpose set forth.

7. I claim the brace-rod or cutter P, when the same is arranged substantially as described, and for the purposes set forth.

8. I claim the diagonal brace-rod S, when the same is constructed and arranged substantially as described, and for the purposes set forth.

9. I claim the slotted brace-bar D, arranged between the land-sides C C, when the same is constructed and arranged substantially as described.

10. I claim securing the beam above the land-sides C C, by means of the braces M M, when the same are combined and arranged substantially as described.

11. I claim securing the cultivator-shares $h\ h$ to the land-sides C C, when the same are constructed and arranged substantially as described, and for the purpose set forth.

In testimony whereof, I have signed my name to this specification in the presence of two subscribing witnesses.

JACOB D. C. OUTWATER.

Witnesses:
J. E. F. HOLMEAD,
JOHN D. BLOOR.